3,329,508
ARTIFICIAL SWEETENING COMPOSITIONS CONTAINING CHOLINE

Louis Freedman, New York, and David B. Sabine, Yonkers, N.Y., assignors to U.S. Vitamin & Pharmaceutical Corporation, a corporation of Delaware
No Drawing. Filed Mar. 5, 1965, Ser. No. 437,562
9 Claims. (Cl. 99—141)

This invention relates to compositions of matter having sweetening properties, particularly to compositions comprising non-caloric sweetening agents. More particularly this invention pertains to compositions comprising combinations of edible salts of cyclamate and edible salts of saccharin which combinations have been improved to enhance their sweetness.

Compositions comprising combinations of salts of cyclamate and saccharin as sweetening agents have been described in the literature. Helgren (U.S. Patent 2,803,-551) has described compositions where the salt of cyclamate comprises 6–67% by weight and the salt of saccharin 0.6–6.7% by weight of said compositions. In the compositions described by Helgren the saccharin salts themselves comprise from about 9% to about 50% of the total weight of said salts. Compositions comprising salts of cyclamate and saccharin in amounts coming within the range described by Helgren are said to be physiologically acceptable to at least 80% of the population using the said product as a sweetening agent, the remaining 20% finding the product to have an off-taste which is variously described as being metallic, bitter, or disagreeable.

The off-taste phenomenon is most generally attributed to saccharin and its salts; in fact the higher the concentration of saccharin in a composition, the greater is the effect of the metallic off-taste resulting when such composition is used.

While saccharin and its salts are known to be approximately ten times sweeter than cyclamate and its salts, this ratio of sweetness is not fixed but increases with increasing ratios of saccharin to cyclamate and decreases with decreasing ratios of saccharin to cyclamate. Therefore, it is not possible to decrease the after-taste and retain the sweetness of saccharin-cyclamate compositions by simply decreasing the saccharin-cyclamate ratio in such compositions.

It is accordingly an object of this invention to provide compositions comprising saccharin and cyclamate wherein the amount of saccharin is reduced sufficiently to eliminate substantially the off-taste so that said compositions will be acceptable to almost the entire population.

It is a further object of this invention to provide compositions of saccharin and cyclamate that resemble cane sugar in appearance and can be used on foods in the same manner as cane sugar.

We have discovered that combinations of salts of cyclamate and salts of saccharin can be made in which the ratio of saccharin to cyclamate can be made as low as 1–50, or as high as 1–3 by adding to said combinations an agent which acts to increase their sweetness. We have found that the addition of an edible salt of choline, in relatively small amounts, 1/12 or less of the amount of cyclamate to a composition of saccharin and cyclamate will effectively enhance the sweetening effect of combinations of saccharin and cyclamate from 10–30%. The edible salt of choline apparently acts as a synergistic agent.

Salts of choline have been described (U.S. Patent 2,601,112) as blending agents in enhancing the saline taste of non-sodium saline-tasting salts, such as potassium chloride and ammonium chloride. Salts of choline such as the dihydrogen citrate and the chloride are described as having an acid or astringent taste with a relatively mild salty taste. We have found quite unexpectedly that such salts of choline may also serve as effective agents in increasing the sweetness in combination with sweetening agents, even though the choline salts per se have no sweetening taste under any conditions. The increased sweetening effect cannot be due to the formation of choline cylamate, because choline cyclamate per se has a sweet taste but less than that of the other soluble salts of cyclamate.

In accordance with this invention we have found that compositions comprising edible salts of cyclamate, edible salts of saccharin and edible salts of choline in which the ratio of cyclamate to saccharin is about from 50 to 1 to about 3 to 1, preferably about 25 to 1, and the ratio of cyclamate to choline is about from 25 to 1 to about 6 to 1, preferably about 12.5 to 1, are satisfactory non-caloric sweetening agents having a minimum of off-taste. We have also found that the same ratios of cyclamate to saccharin and cyclamate to choline when incorporated with an inert carriers, such as gum acacia, polyethylene glycols, or alginates, produce a composition which resembles cane sugar in appearance, can be sprinkled on foods in the same manner, and has a negligible caloric content.

Compositions containing from about 3–18%, preferably about 12½%, by weight of an edible salt of cyclamate, from about 0.1 to 2%, preferably about 0.5%, by weight of an edible salt of saccharin and from about 0.1% to 1.0%, preferably about 1.0%, by weight of an edible salt of choline, when used in foods such as cereal, or in drinks such as coffee or tea, have slightly more sweetening power than an amount of sucrose approximately equal in weight to the weight of said compositions, without any disagreeable after-taste.

The compositions comprising an edible salt of cyclamate, an edible salt of saccharin, and an edible salt of choline may be dissolved in water and used as aqueous sweetening solutions. These solutions may comprise from about 60 to 140 grams of an edible salt of cyclamate, from about 2 to 20 grams of an edible salt of saccharin, and from about 1 to 15 grams of an edible salt of choline per liter of solution. If desired preservatives may be added to the solution.

In preparing the compositions of our invention any of the edible salts of cyclamate, saccharin, and choline may be used. Suitable salts of cyclamate and saccharin are the calcium, magnesium, sodium, potassium and ammonium salts. Preferably, the calcium salts are used, and magnesium cyclamate has been found particularly useful because of its high solubility. Suitable salts of choline are the chloride, dihydrogen citrate and bitartrate salts. Preferably the choline is used. Choline bitartrate cannot be used in solutions when the calcium salt of cyclamate or saccharin is used because of the formation of the insoluble calcium bitartrate. This restriction does not apply when a dry composition is prepared.

In addition to the active ingredients, excipients and solvents, the compositions may, if desired, contain preservatives and inert coloring agents.

The invention will appear more fully from the examples which follow, which are set forth by way of illustration only; and it is to be understood that it is here intended to cover all changes and modifications of the examples herein which do not constitute departures from the spirit and scope of the invention. In all of the examples the parts of the ingredients are by weight.

Example I

| | | |
|---|---|---|
| Calcium cyclamate | grams | 100 |
| Calcium saccharin | do | 2 |
| Choline chloride | do | 8.45 |
| Benzoic acid | do | 1 |
| Methyl paraben | mg | 500 |
| Water q.s., 1 liter. | | |

The ingredients were dissolved in the water by agitation and the resulting solution filtered. One ml. of this solution is approximately equivalent in sweetness to two teaspoonful of sucrose.

Example II

| | | |
|---|---|---|
| Calcium cyclamate | grams | 60 |
| Calcium saccharin | do | 20 |
| Choline chloride | do | 5.76 |
| Benzoic acid | do | 1 |
| Methyl paraben | mg | 500 |
| Water q.s., 1 liter. | | |

As in Example I, the ingredients were dissolved by agitation and the solution filtered.

Example III

| | | |
|---|---|---|
| Calcium cyclamate | grams | 125 |
| Choline chloride | do | 10 |
| Calcium saccharin | do | 5 |
| Benzoic acid | do | 1 |
| Methyl paraben | do | 0.5 |
| Water q.s., 1 liter. | | |

The ingredients were dissolved by agitation and the solution filtered.

Example IV

| | | |
|---|---|---|
| Magnesium cyclamate | grams | 130 |
| Choline chloride | do | 10 |
| Ammonium saccharin | do | 5 |
| Benzoic acid | do | 1 |
| Methyl paraben | do | 0.5 |
| Water q.s., 1 liter. | | |

The ingredients were dissolved by agitation and the solution filtered.

Example V

| | | |
|---|---|---|
| Gum acacia | grams | 47 |
| Mannitol | do | 40 |
| Crystalline sorbitol | do | 5 |
| Tween 80 | do | 0.25 |
| Calcium cyclamate | do | 3 |
| Calcium saccharin | do | 0.12 |
| Choline chloride | do | 0.24 |

The acacia and mannitol were thoroughly mixed. The remaining ingredients were dissolved in a minimum amount of water, added to the mannitol-acacia mix then the whole thoroughly blended. The damp mass was forced through a screen of the appropriate size to give the desired granules and dried in an air drier at a slightly elevated temperature. To hasten the drying part of the water can be replaced by alcohol. If desired, the above composition may be further ground and tableted in the usual manner.

Example VI

| | | |
|---|---|---|
| Calcium cyclamate | grams | 4.50 |
| Sodium saccharin | do | 0.18 |
| Choline dihydrogen citrate | do | 0.76 |
| Polyethylene glycol 6000 | do | 44.56 |

The calcium cyclamate, sodium saccharin and choline chloride were thoroughly mixed, the polyethylene glycol added, the whole mixed and forced through a screen of appropriate size.

Example VII

| | | |
|---|---|---|
| Calcium cyclamate | grams | 6.25 |
| Sodium saccharin | do | 0.25 |
| Choline bitartrate | do | 1 |
| Polyethylene glycol 6000 | do | 42.50 |

The calcium cyclamate, sodium saccharin and choline bitartrate were thoroughly mixed, the polyethylene glycol added, the whole mixed and forced through a screen of appropriate size.

Example VIII

| | | |
|---|---|---|
| Calcium cyclamate | grams | 6.25 |
| Sodium saccharin | do | 0.25 |
| Choline bitartrate | do | 1 |
| Propylene glycol alginate | do | 10 |
| Polyethylene glycol 6000 | do | 32.50 |

The calcium cyclamate, sodium saccharin, choline bitartrate and propylene glycol alginate were thoroughly mixed, the polyethylene glycol added, the whole mixed, and forced through a screen of appropriate size.

None of the compositions, prepared as described in the examples, showed an after-taste when given for tasting to twenty subjects.

We claim:

1. A sweetening composition comprising in combination an edible salt of cyclamate, an edible salt of saccharin and an edible salt of choline wherein the ratio in parts by weight of the edible salt of cyclamate to the edible salt of saccharin is from about 50 to 1 to about 3 to 1, and of the edible salt of cyclamate to the edible salt of choline is from about 25 to 1 to about 6 to 1.

2. A sweetening composition comprising in combination in parts by weight 25 parts of an edible salt of cyclamate, 1 part of an edible salt of saccharin and 2 parts of an edible salt of choline.

3. A sweetening composition comprising in combination in parts by weight 25 parts of calcium cyclamate, 1 part of calcium saccharin and 2 parts of choline chloride.

4. A solid sweetening composition containing from about 3–18% by weight of an edible salt of cyclamate, from about 0.1 to 2% by weight of an edible salt of saccharin and from about 0.2 to 1% by weight of an edible salt of choline.

5. A solid sweetening composition containing about 12.5% by weight of an edible salt of cyclamate, about 0.5% by weight of an edible salt of saccharin, and about 1% by weight of an edible salt of choline.

6. A solid sweetening composition containing about 12.5% by weight of calcium cyclamate, about 0.5% by weight of calcium saccharin and about 1% by weight of choline chloride.

7. A sweetening composition in dry form containing about 3% by weight of calcium cyclamate, about 0.12% by weight of calcium saccharin and about 0.25% by weight of choline bitartrate.

8. An aqueous sweetening solution comprising about 125 grams calcium cyclamate, about 5 grams calcium saccharin, and about 10 grams choline chloride per liter of solution.

9. An aqueous sweetening solution comprising about 130 grams magnesium cyclamate, about 5 grams ammonium saccharin, and about 10 grams choline chloride per liter of solution.

No references cited.

S. E. HEYMAN, *Assistant Examiner.*

A. LOUIS MONACELL, *Primary Examiner.*